United States Patent
Hayden et al.

(10) Patent No.: US 11,808,347 B2
(45) Date of Patent: Nov. 7, 2023

(54) AUTOMATIC PARK LOCK

(71) Applicant: Deere & Company, Moline, IL (US)

(72) Inventors: Stephan R. Hayden, Sun Prairie, WI (US); Donald W. Ertmer, Lodi, WI (US); Nathan L. Yolitz, Horicon, WI (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/446,493

(22) Filed: Aug. 31, 2021

(65) Prior Publication Data
US 2023/0066305 A1 Mar. 2, 2023

(51) Int. Cl.
*F16H 61/22* (2006.01)
*F16H 59/54* (2006.01)
*F16H 59/74* (2006.01)
*F16H 59/10* (2006.01)

(52) U.S. Cl.
CPC ............ *F16H 61/22* (2013.01); *F16H 59/54* (2013.01); *F16H 59/74* (2013.01); *F16H 59/10* (2013.01); *F16H 2059/746* (2013.01); *F16H 2061/223* (2013.01)

(58) Field of Classification Search
CPC .... F16H 61/22; F16H 2061/223; F16H 59/54; F16H 59/74; F16H 59/10; F16H 2059/746; F16H 63/3475
See application file for complete search history.

(56) References Cited

U.S. PATENT DOCUMENTS

| | | | |
|---|---|---|---|
| 4,223,768 A | 9/1980 | Iwanaga | |
| 4,473,141 A * | 9/1984 | Mochida | F16H 59/10 192/220.2 |
| 4,474,085 A | 10/1984 | DeVogelaere et al. | |
| 4,887,702 A | 12/1989 | Ratke et al. | |
| 4,947,967 A * | 8/1990 | Kito | B60R 25/02144 477/96 |
| 5,009,295 A | 4/1991 | Kinkade et al. | |
| 5,018,610 A | 5/1991 | Rolinski et al. | |
| 5,027,929 A | 7/1991 | Ratke et al. | |
| 5,076,114 A | 12/1991 | Moody | |
| 5,096,033 A | 3/1992 | Osborn | |
| 5,167,308 A | 12/1992 | Osborn | |
| 5,176,231 A | 1/1993 | Moody et al. | |
| 5,402,870 A | 4/1995 | Osborn | |
| 5,489,246 A | 2/1996 | Moody et al. | |

(Continued)

FOREIGN PATENT DOCUMENTS

| | | |
|---|---|---|
| EP | 0709597 A1 | 5/1996 |
| EP | 0987473 A2 | 3/2000 |

OTHER PUBLICATIONS

Great Britain Search Report issued in application No. 2210854.2 dated Jan. 26, 2023 (04 pages).

*Primary Examiner* — Huan Le

(57) ABSTRACT

An automatic park lock for an off road or recreational utility vehicle includes a shift interlock solenoid with a spring biased plunger engaging and locking an operator shift lever in the park position. A cam surface on the operator shift lever slopes between a first end and a second end, and has a groove to lock the plunger to the park position. A controller energizes the shift interlock solenoid to retract the plunger when a plurality of operating parameters are satisfied.

12 Claims, 5 Drawing Sheets

(56) References Cited

U.S. PATENT DOCUMENTS

| | | | |
|---|---|---|---|
| 5,647,818 A | | 7/1997 | Moody |
| 5,718,312 A | | 2/1998 | Osborn et al. |
| 5,794,748 A | | 8/1998 | Heuver et al. |
| 5,902,209 A | | 5/1999 | Moody |
| 6,135,230 A | * | 10/2000 | Schenck .................. E02F 9/24 180/269 |
| 6,575,049 B1 | | 6/2003 | Hasegawa |
| 6,676,564 B2 | | 1/2004 | Gruden |
| 6,689,014 B2 | * | 2/2004 | Fleming .................. F16H 61/22 477/96 |
| 7,124,874 B2 | * | 10/2006 | Wang ...................... F16H 61/22 192/220.4 |
| 7,530,286 B2 | | 5/2009 | Howe et al. |
| 8,400,242 B2 | | 3/2013 | Zelmer et al. |
| 8,459,433 B2 | | 6/2013 | Volz et al. |
| 2004/0031660 A1 | | 2/2004 | Kliemannel |
| 2020/0292061 A1 | | 9/2020 | Twa et al. |

* cited by examiner

AUTOMATIC PARK LOCK

FIELD OF THE INVENTION

This invention relates to an automatic park lock for an off-road or recreational utility vehicle.

BACKGROUND OF THE INVENTION

Automatic park locks are known for automotive vehicles for locking operator shift levers in the park position. However, an automatic park lock is needed for an off-road or recreational utility vehicle that is inexpensive, easy to operate, and has few parts.

SUMMARY OF THE INVENTION

An automatic park lock for an off-road or recreational utility vehicle includes an operator shift lever that pivots on an axis and is connected to a vehicle transmission having a plurality of positions including reverse, neutral, forward high, forward low, and park. A cam surface on the operator shift lever slopes between a first end and a second end, and has a groove corresponding to the park position. A shift interlock solenoid has a plunger that is spring biased to an extended position into the groove to lock the operator shift lever in the park position. An electronic controller energizes the shift interlock solenoid to retract the plunger from the groove if the controller receives a plurality of signals indicating the ignition key is on, the brake pedal is depressed, and the engine is at or below idle speed. The retracted plunger contacts the sloped cam surface between the first end and the second end.

DESCRIPTION OF THE PREFERRED EMBODIMENT

Figure 4:
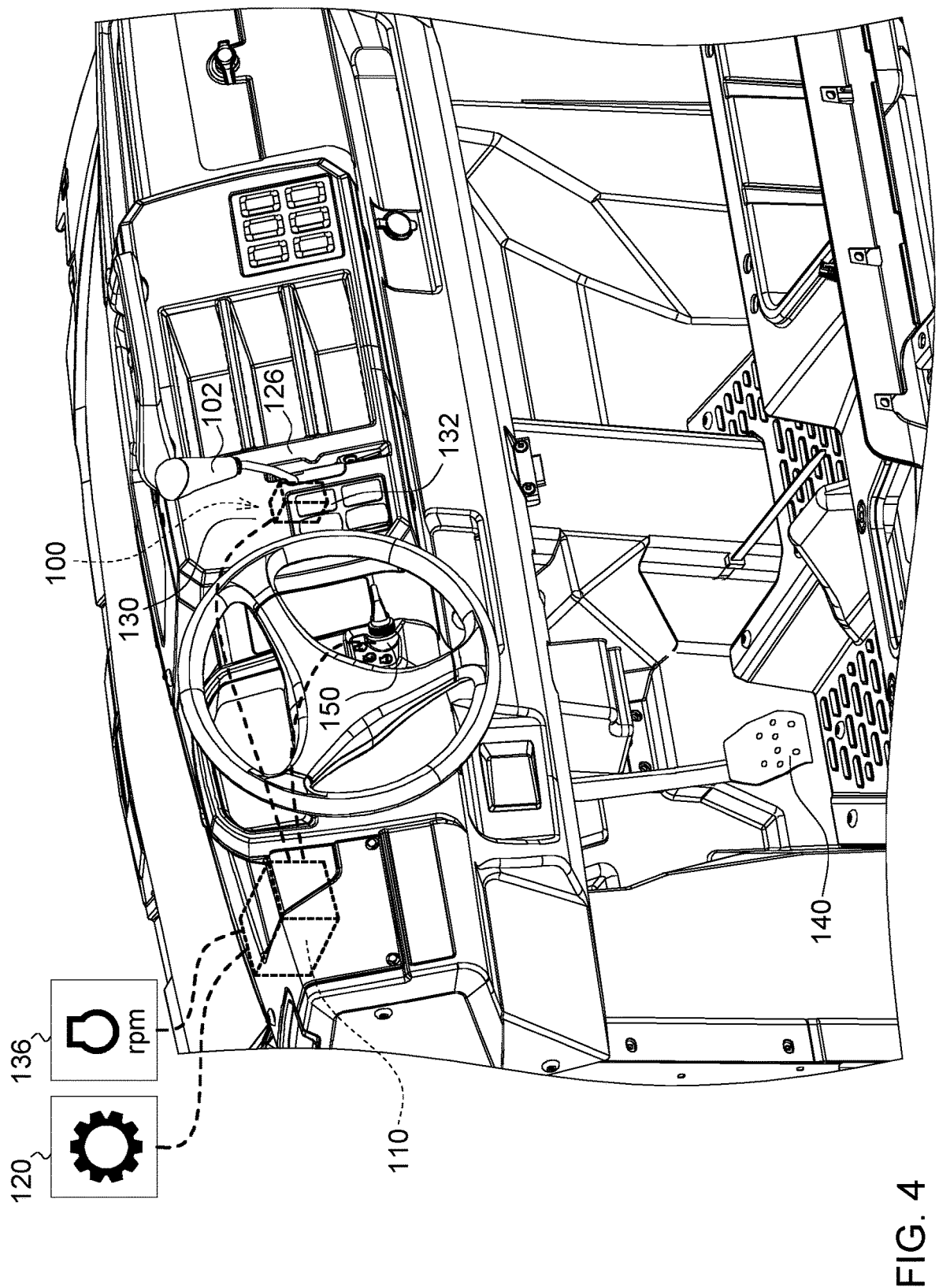
FIG. 4 is a perspective view of an off-road or recreational utility vehicle with an automatic park lock according to a preferred embodiment of the invention.

In one embodiment, automatic park lock 100 may be on an off-road or recreational utility vehicle having an operator shift lever 106 to shift between reverse, neutral, high range, low range and park positions, and a continuously variable transmission (CVT) or other automatic transmission. The operator shift lever may be a casting that pivots on axis 118 mounted to the dashboard at the front of the cab and in front of or to the side of the operator seat. Shift handle 102 may be a wire form attached to the operator shift lever with spring 112 allowing limited side-to-side movement of the shift handle relative to pivot axis 118. The lower end of the operator shift lever may be connected to rod 108 which extends to the vehicle transmission or gearbox 120 schematically shown in FIG. 4.

In one embodiment, automatic park lock 100 may include shift interlock solenoid 104 with plunger or pin 114 that may be spring biased outwardly. When the shift interlock solenoid is not energized or powered, coil spring 122 may bias the plunger or pin into engagement with groove 124 near the second or upper end of the operator shift lever 106. If the plunger or pin is extended into the groove, it locks the operator shift lever in the park position. When the shift interlock solenoid is energized or powered, the plunger or pin is retracted and may contact cam surface 116 on the operator shift lever. The retracted plunger or pin allows the operator shift lever to pivot between the reverse, neutral, high range, and low range, and park positions.

Figure 5:
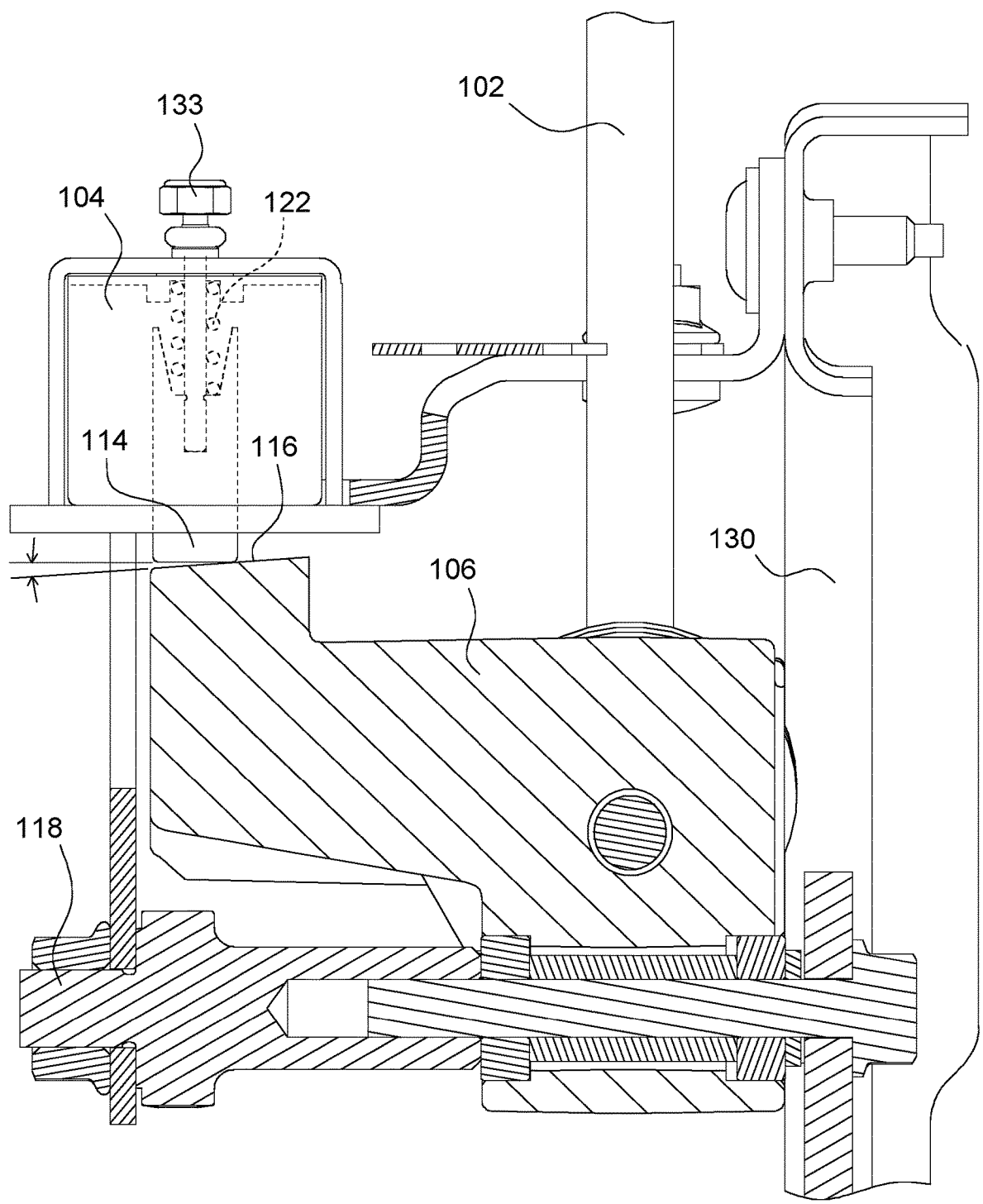
FIG. 5 is a cross section view showing the plunger and cam surface of an automatic park lock in the unlocked position according to a preferred embodiment of the invention.

In one embodiment, as shown in FIG. 5, the automatic park lock may include an operator shift lever with a cam surface 116 which may be angled or sloped from one side to the other side, so that only the circumferential edge of plunger or pin 114 contacts the cam surface. As a result, the plunger or pin may roll or maintain line contact as the operator shift lever pivots, reducing friction, minimizing wear to the plunger or pin and providing a smooth operational feel.

In one embodiment, automatic park lock 100 may include shift interlock solenoid 104 which must be energized or powered to move plunger or pin 114 from an extended (off) position to a retracted (on) position. The automatic park lock may include electronic controller 110 which determines when to energize or power shift interlock solenoid 104 to retract plunger or pin 114.

Figure 3:
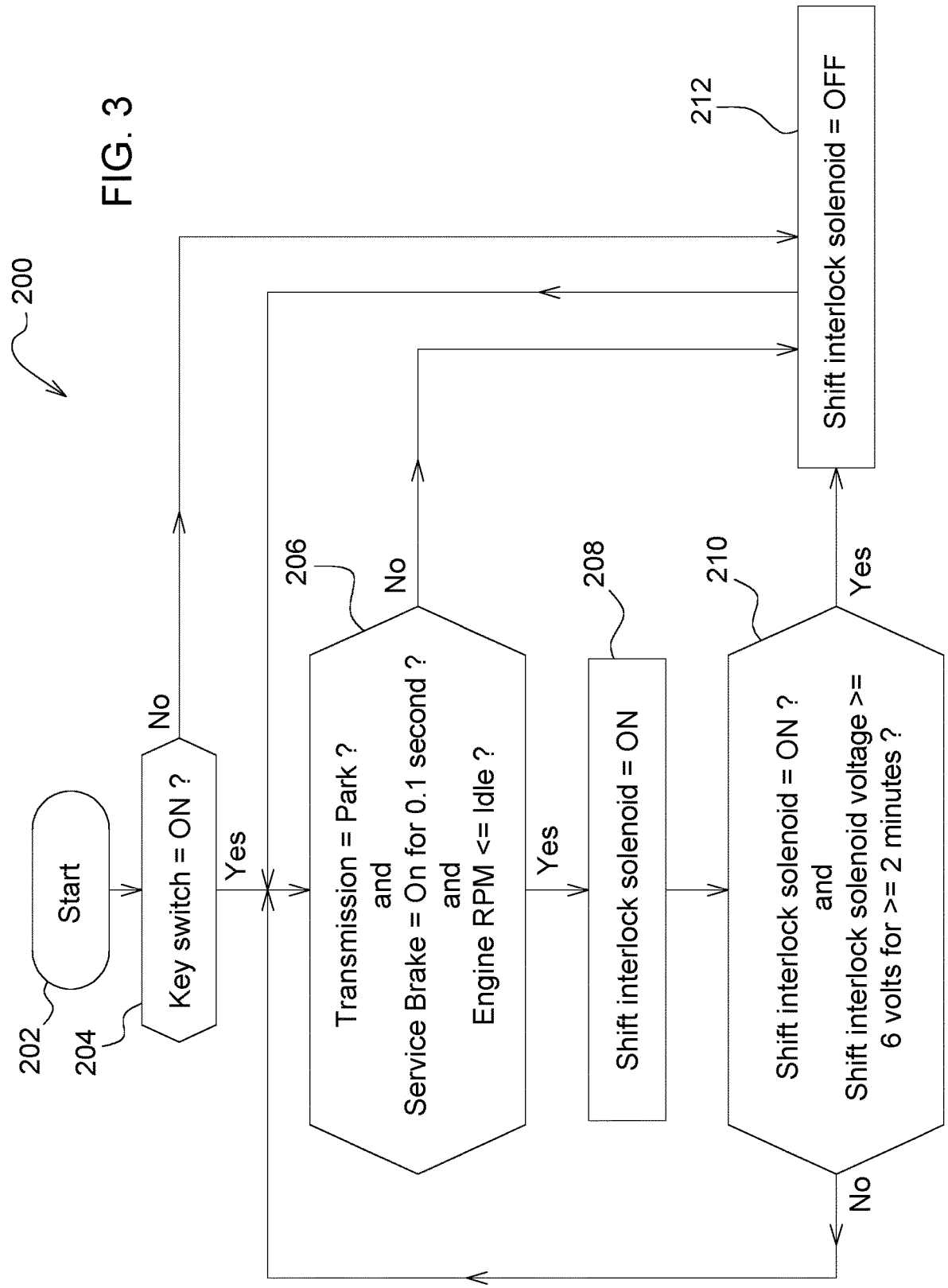
FIG. 3 is a logic diagram for an automatic park lock according to a preferred embodiment of the invention.

For example, the automatic park lock may include electronic controller 110 that uses logic steps shown in FIG. 3 starting at block 202. In block 204, the electronic controller may determine if ignition key switch 150 is off or on. If ignition key switch 150 is off, shift interlock solenoid 104 is not energized or powered (off), and coil spring 122 urges plunger or pin 114 into groove 124 to lock operator shift lever 106 in the park position. If ignition key switch 150 is on, the electronic controller may determine if inputs satisfy the conditions of block 206: Transmission 120 must be in the park position, service brake pedal 140 must be depressed for a duration such as 0.1 second, and engine speed sensor 136 must indicate engine RPM is less than or equal to an idle speed such as 700 rpm. The transmission, service brake pedal and engine speed sensors are shown schematically in FIG. 4. If all conditions in block 206 are met, the controller may turn on power to shift interlock solenoid 104 in block 208 to retract plunger or pin 114 from groove 124. As a result, the operator shift lever can be shifted out of park. If not all conditions in block 206 are met, the shift interlock solenoid is not energized or powered (off) and coil spring 122 holds the pin or plunger in the groove to lock operator shift lever 106 in the park position, as shown in block 212. For example, the operator shift lever may stay locked in the park position if service brake pedal 140 is not depressed or engine speed sensor 136 is above a specified RPM.

In one embodiment, automatic park lock 100 may turn off power to shift interlock solenoid 104 if service brake pedal 140 is depressed for at least a specified time such as 2 minutes, locking operator shift lever 106 in the park position. This is shown block 210 of FIG. 3. For example, if electronic controller 110 detects the shift interlock solenoid is energized or powered (on), and shift interlock solenoid voltage is greater than or equal to a specified voltage such as 6 volts for a specified time such as at least 2 minutes, the controller may turn off electric power to the shift interlock solenoid in block 212, locking the operator shift lever in the park position. By turning off electric power, battery use may be reduced for powering or energizing the solenoid. After the interruption of power, the electronic controller may restore power to the shift interlock solenoid and allow shifting out of park if the operator releases the service brake pedal and then depresses it again, and the other conditions of block 206 are satisfied.

Figure 1:
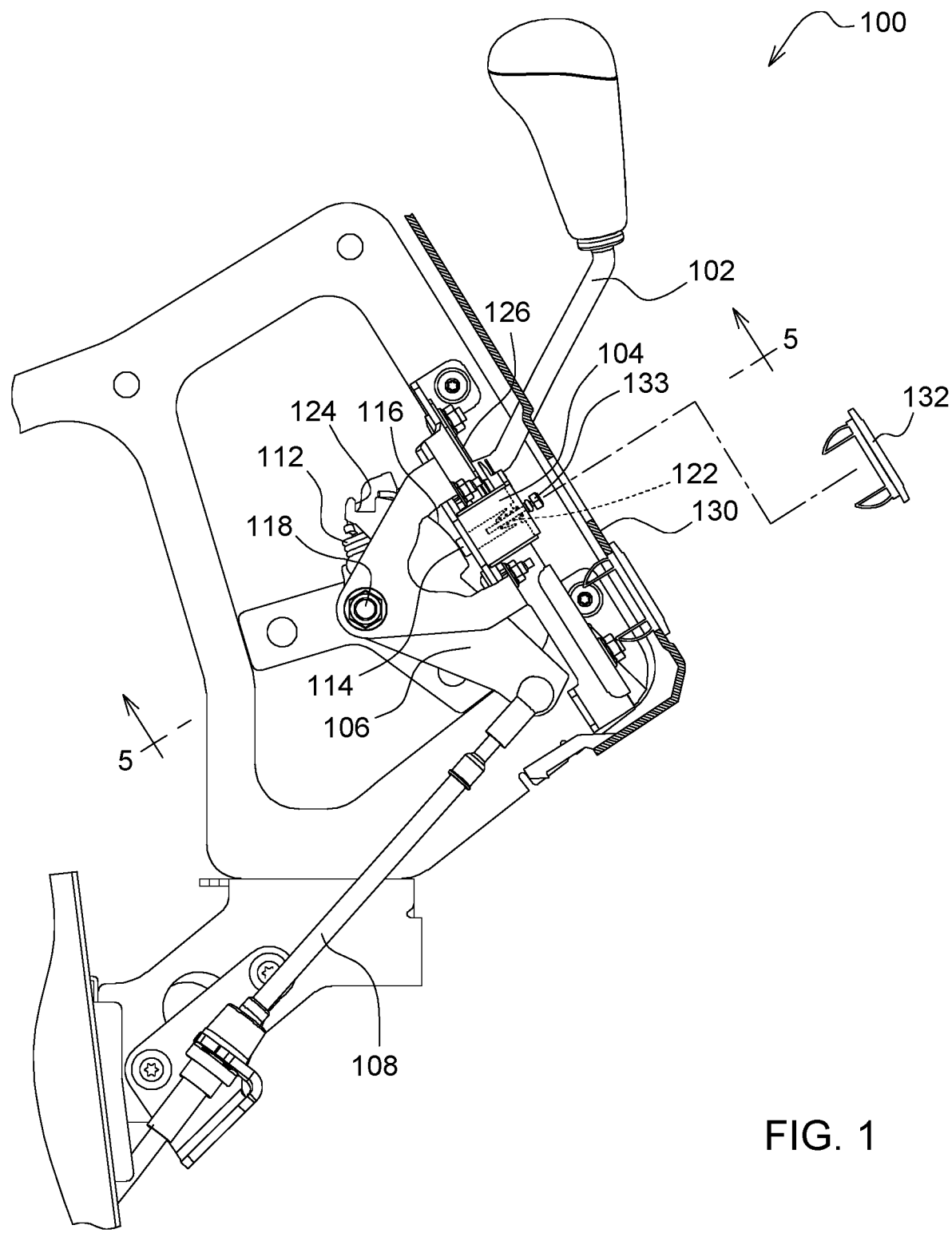
FIG. 1 is a perspective view of an automatic park lock in the unlocked position according to a preferred embodiment of the invention.
Figure 2:
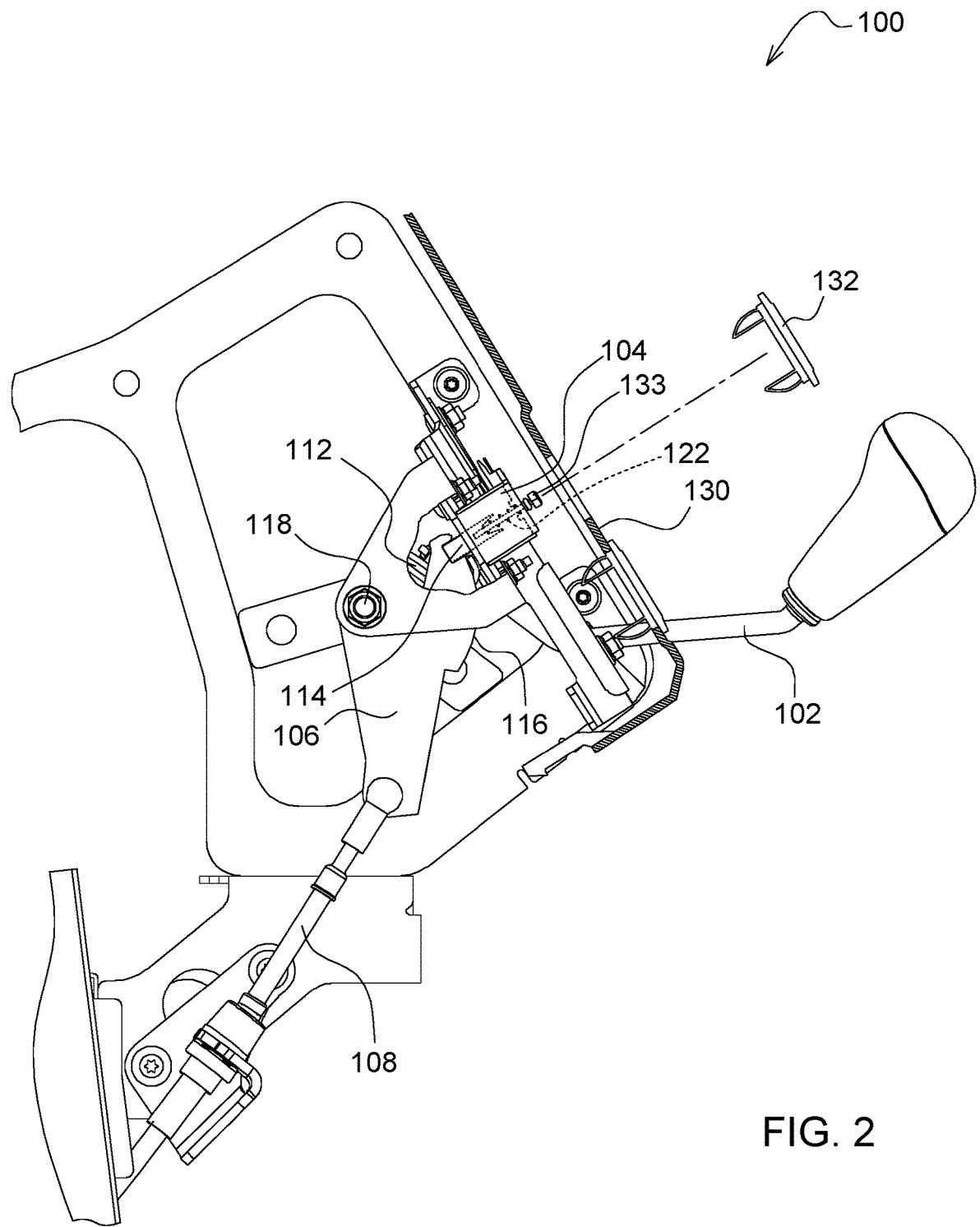
FIG. 2 is a perspective view of an automatic park lock in the locked position according to a preferred embodiment of the invention.

In one embodiment shown in FIGS. 1 and 2, automatic park lock 100 may be disengaged from park if the ignition key is on, the operator shift lever is in park, brake pedal is depressed, and engine speed is at idle. The automatic park lock does not require pushing a button on the shift lever or another switch to disengage the automatic park lock. Additionally, automatic park lock 100 also may be de-activated manually. For example, the operator may wish to disengage the automatic park lock if it stays locked during an interruption in electrical power to shift interlock solenoid 104. The shift interlock solenoid may be located in the operator station behind one or more style panels 130 on the dashboard or front of the operator cab of the off-road or recreational utility vehicle. The style panels may have integrated access ports 132 that allow the operator to manually retract the plunger from the groove without tools and unlock the operator shift lever from the park position. The deactivation feature may be located where it can be accessed while the operator is in the driver seat with his or her foot on the service brake pedal.

Having described the preferred embodiment, it will become apparent that various modifications can be made without departing from the scope of the invention as defined in the accompanying claims.

The invention claimed is:

1. An automatic park lock, comprising:
   an operator shift lever that pivots on an axis and is connected to a vehicle transmission having a plurality of positions including reverse, neutral, forward high, forward low, and park;
   a cam surface on the operator shift lever sloping between a first end and a second end, and having a groove corresponding to the park position;
   a shift interlock solenoid with a plunger that is spring biased to an extended position into the groove to lock the operator shift lever in the park position;
   an electronic controller that energizes the shift interlock solenoid to retract the plunger from the groove if the controller receives a plurality of signals indicating an ignition key is on, a brake pedal is depressed, and an engine is at or below an idle speed, and deenergizes the shift interlock solenoid so the plunger extends and contacts the sloped cam surface between the first end and the second end if the controller detects the vehicle transmission is not in the park position.

2. The automatic park lock of claim 1 wherein the cam surface is sloped from a first side to a second side; the retracted plunger having only an edge in contact with the sloped cam surface.

3. The automatic park lock of claim 1 wherein the controller stops energizing the shift interlock solenoid if the brake pedal is depressed longer than a specified time.

4. The automatic park lock of claim 1 wherein the controller stops energizing the shift interlock solenoid if the controller detects at least a specified voltage to the shift interlock solenoid for at least a specified time.

5. The automatic park lock of claim 1 further comprising an access port for manually retracting the plunger from the groove to unlock the operator shift lever from the park position.

6. An automatic park lock, comprising:
   a shift interlock solenoid with a spring biased plunger engaging and locking an operator shift lever in a park position; and
   a controller energizing the shift interlock solenoid to retract the plunger when a plurality of operating parameters are satisfied; the controller de-energizing the shift interlock solenoid if one of the operating parameters is satisfied for at least a specified time period so the plunger re-engages and locks the operator shift lever in the park position.

7. The automatic park lock of claim 6 wherein one of the operating parameters is a service brake pedal depression.

8. The automatic park lock of claim 6 wherein the spring biased plunger is accessible from an operator seat to unlock the operator shift lever from the park position.

9. The automatic park lock of claim 6 wherein the plunger rolls on a cam surface of the operator shift lever.

10. An automatic park lock, comprising:
    a pivoting operator shift lever having a cam surface that includes a groove engaged by a plunger biased by a spring to lock the operator shift lever in the park position;
    the cam surface having a slope from side to side on which the plunger rolls when the plunger is retracted from the groove to unlock the operator shift lever from the park position;
    wherein the plunger is retracted from the groove if a plurality of operating conditions are satisfied including depression of a service brake pedal and engine speed at or below an idle speed setting.

11. The automatic park lock of claim 10 further comprising a shift interlock solenoid energized by an electronic controller to retract the plunger.

12. The automatic park lock of claim 10 further comprising a de-activation port accessible from the operator seat to retract the plunger from the groove.

* * * * *